United States Patent
Yoshimoto

(10) Patent No.: US 7,485,163 B2
(45) Date of Patent: Feb. 3, 2009

(54) NOZZLE AND FILTER-TYPE DUST COLLECTOR

(75) Inventor: Satoshi Yoshimoto, Hyogo (JP)

(73) Assignee: Takuma Co., Ltd., Osaka (JP)

( * ) Notice: Subject to any disclaimer, the term of this patent is extended or adjusted under 35 U.S.C. 154(b) by 512 days.

(21) Appl. No.: 11/122,087

(22) Filed: May 5, 2005

(65) Prior Publication Data

US 2006/0075726 A1    Apr. 13, 2006

(30) Foreign Application Priority Data

Oct. 13, 2004    (JP) ............................ 2004-298752

(51) Int. Cl.
*B01D 46/04* (2006.01)

(52) U.S. Cl. .............................. 55/302; 55/283; 95/279; 95/280; 210/791; 137/15.1; 137/83; 222/151; 141/70; 239/126; 239/153; 239/222.11; 239/222.21

(58) Field of Classification Search ............... 55/283, 55/302; 95/279, 280; 210/791; 137/15.1, 137/83; 222/151; 141/70; 239/126, 153, 239/222.11–222.21
See application file for complete search history.

(56) References Cited

U.S. PATENT DOCUMENTS

| | | | | |
|---|---|---|---|---|
| 3,683,595 A * | 8/1972 | Houghton et al. | ............. | 55/302 |
| 3,708,125 A | 1/1973 | Patterson | ................. | 239/428.5 |
| 3,874,857 A * | 4/1975 | Hunt et al. | ..................... | 55/302 |
| 4,026,474 A | 5/1977 | Knauer et al. | ................ | 239/430 |
| 4,280,826 A * | 7/1981 | Johnson, Jr. | .................. | 55/302 |
| 4,504,288 A * | 3/1985 | Kreft | ............................ | 55/302 |
| 4,539,025 A * | 9/1985 | Ciliberti et al. | ............... | 55/302 |
| 5,002,594 A * | 3/1991 | Merritt | ........................ | 55/302 |
| 5,562,251 A | 10/1996 | Elliott | ........................ | 239/396 |
| 6,129,852 A * | 10/2000 | Elliott et al. | ................. | 210/791 |
| 6,149,716 A * | 11/2000 | Bach et al. | ..................... | 95/280 |
| 6,432,153 B1 * | 8/2002 | Richard | ....................... | 55/302 |
| 6,902,592 B2 * | 6/2005 | Green et al. | .................. | 55/302 |
| 2006/0174595 A1 * | 8/2006 | Moktader et al. | ............. | 55/418 |

FOREIGN PATENT DOCUMENTS

DE    100 28 944 A1    12/2001
JP    2000-153120    6/2000

* cited by examiner

*Primary Examiner*—Jason M Greene
*Assistant Examiner*—Minh-Chau T Pham
(74) *Attorney, Agent, or Firm*—Kratz, Quintos & Hanson, LLP

(57) ABSTRACT

There are provided a nozzle capable of enhancing the straight-advancing capability of jetted fluid to increase the back wash effect of a filter member, and a filter-type dust collector capable of effectively carrying out dust removal from a filter member with such a nozzle. To this end, the nozzle has a Laval nozzle section secured to the inside of an outer tube at its proximal end and a fluid guide section disposed at the leading end of the outer tube. The fluid guide section has a plurality of suction holes elongated in the flowing direction of the pressurized fluid. This nozzle is mounted on a pulse header tube of a dust removal device.

9 Claims, 5 Drawing Sheets

4 (a)

4 (b)

NOZZLE AND FILTER-TYPE DUST COLLECTOR

TECHNICAL FIELD

The invention relates to a nozzle for jetting a fluid and a filter-type dust collector using such a nozzle.

BACKGROUND ART

Known waste incineration systems have suffered from the drawback that dust generated in flue gas during burning of waste in an incinerator adheres to the inner wall surface of the exhaust gas duct etc. Since the neglect of dust adhesion/ deposition leads to problems such as blockage of the duct, many attempts have been made to remove dust.

If dust adheres to a filter member, in particular, in a filter-type dust collector for collecting dust from exhaust gas, there will arise increasing risks of a drop in dust-collection efficiency, a backflow of exhaust gas resulting from a rise in the internal pressure of the dust collector, and damage to the dust collector itself. For this reason, dust removal has been heretofore seriously considered. Typical filter-type dust collectors include bug filter systems which use, as a filter member, perforated cloth or filter fabric made from e.g., glass fiber, and gas filter systems (e.g., Japanese Patent Publication Kokai No. 2000-153120) which use, as a filter member, a porous ceramic filter capable of dust collection from exhaust gas having high temperatures.

For these filter-type dust collectors, the compressed air jet method is the most common means for removing dust from a filter member.

Next, there will be explained one known dust removal method with compressed air.

FIG. 5 shows a longitudinal section of a gas filter system equipped with a conventional dust removal device. This gas filter system 100 has a casing 104 the inner space of which is divided into two spaces by a partition wall 101, that is, a gas introducing chamber 102 for storing exhaust gas introduced therein and a gas exhaust chamber 103 for discharging clean gas after dust collection treatment. In the gas introducing chamber 102, there are provided a plurality of tubular ceramic filters 105 which lie between the partition wall 101 and the outer wall 102A of the gas introducing chamber 102 opposed to the partition wall 101. Each ceramic filter 105 is opened at one end and closed at the other end. The open end penetrates into the partition wall 101, being supported by the partition wall 101, whereas the closed end is supported on a supporting piece attached to the outer wall 102A. The inner space of each tubular ceramic filter 105 communicates with the inside of the gas exhaust chamber 103 through the open end of the ceramic filter 105. The open end of the ceramic filter 105 is provided with a Venturi tube 106 attached thereto. It should be noted that reference numeral 102a designates a gas inlet for introducing exhaust gas into the gas introducing chamber 102 whereas reference numeral 103a designates a gas outlet for discharging clean gas. In addition, reference numeral 107 designates a dust outlet for discharging dust from the gas introducing chamber 102 to the outside of the system.

The gas filter system 100 is provided with a dust removal device 110 for removing dust which sticks to the outer faces of the ceramic filters 105. The dust removal device 110 has a header tube 111 for pulsed jet air (compressed air), the header tube 111 being disposed within the gas exhaust chamber 103 so as to extend vertically. The header tube 111 includes spouts 112 for shooting air forth in a stream (pulsed jet air) and each spout 112 is placed at a position opposite to the Venturi tube 106.

In the gas filter system 100 of the above structure, dust-containing exhaust gas, which has been introduced into the gas introducing chamber 102 through the gas inlet 102a, is let in the inner spaces of the ceramic filters 105 for dust collection so that it is cleaned. This clean gas is, in turn, discharged to the outside of the system, after passing through the Venturi tubes 106, the gas exhaust chamber 103 and the gas outlet 103a. After the dust collection from the exhaust gas has been continuously carried out for a desired period of time, the dust sticking to the outer surfaces of the ceramic filters 105 is removed. In the dust removal, pulsed jet air is directed to the inner spaces of the ceramic filters 105 from the spouts 112 of the header tube 111 through the Venturi tubes 106.

Incidentally, filter-type dust collectors using filter fabric as a filter member are designed to remove dust from the filter fabric, utilizing the back wash of pressurized air intermittently sent to the cleaning side of the filter fabric (the pulse jet method) and the whisking effect of the filter fabric twisted by the pressurized air.

The gas filter system 100 which employs the above-described ceramic filters 105, however, cannot be expected to have such a whisking effect, not only because the system 100 is used for exhaust gas having high temperatures of 300 to 800° C. which causes strong dust adhesion, but also because of the rigidity of the ceramic filters 105.

Further, in the dust removal device 110 such as shown in FIG. 5, air jetted from the spouts 112 disperses in all directions before reaching the Venturi tubes 106, which makes it difficult to efficiently direct the jet air to the inside of the ceramic filters 105.

Therefore, it becomes necessary to increase the pressure of the pulsed jet air or increase the frequency of dust removal by shortening the pulsing intervals, and as a result, not only a large-sized system configuration becomes involved but also the internal pressure of the exhaust gas processing system is increased.

The invention has been directed to overcoming the foregoing problems and a primary object of the invention is therefore to provide a nozzle capable of increasing the back-wash effect of the filter member by enhancing the concentrated distribution of a jet fluid. Another object of the invention is to provide a filter-type dust collector capable of efficient dust removal from a filter member by use of a nozzle.

SUMMARY OF THE INVENTION

In accomplishing these and other objects, there has been provided, in accordance with the present invention, a nozzle having a tubular fluid guide section disposed at the leading end of a Laval nozzle section, wherein an opening elongated in the flowing direction of a fluid is formed in the fluid guide section.

Since the nozzle of the invention is equipped with a Laval nozzle section, a fluid such as air supplied from the proximal end of the nozzle can be accelerated and jetted as a supersonic fluid accompanied with a shock wave. In addition, since the Laval nozzle section includes, at its leading end, a fluid guide section having an elongated opening that is directed in the flowing direction of the fluid, the fluid flowing around the nozzle can be suctioned into the nozzle to impart straightness to the jet fluid. As a result, the jet fluid can be prevented from dispersing in all directions to achieve highly concentrated jet fluid distribution.

According to the invention, there has been provided a filter-type dust collector which has a filter member for collecting dust from exhaust gas to clean it and dust removal means for removing extraneous matter adhering to the surface of the filter member with a fluid jetted from a nozzle, wherein the nozzle has a Laval nozzle section and a fluid guide section disposed at the leading end of the Laval nozzle section; and wherein the fluid guide section has an opening elongated in the flowing direction of the fluid.

According to this filter-type dust collector, since it is equipped with a nozzle having a Laval nozzle section and a fluid guide section with an elongated opening, a highly intensive supersonic stream of fluid accompanied with a shock wave can be directed against the filter member. Thus, shocks are given to the filter member by the shock wave so that removal of highly-adhesive, extraneous matter from the surface of the filter member can be ensured. In addition, since extraneous matter can be removed with high efficiency, the amount of fluid to be supplied can be reduced, thereby saving the running cost for the removal of extraneous matter. Further, since there is no need to increase fluid pressure unlike the prior art systems, the internal pressure of the filter-type dust collector is not abruptly increased by injection of the fluid, which enables it to eliminate the adverse effect on the dust collector.

DETAILED DESCRIPTION OF THE INVENTION

Referring now to the accompanying drawings, a nozzle and a filter-type dust collector will be concretely described according to a preferred embodiment of the invention.

The present embodiment is associated with a gas filter system having ceramic filters as a filter member, which is a typical example of the filter-type dust collector.

Figure 1:
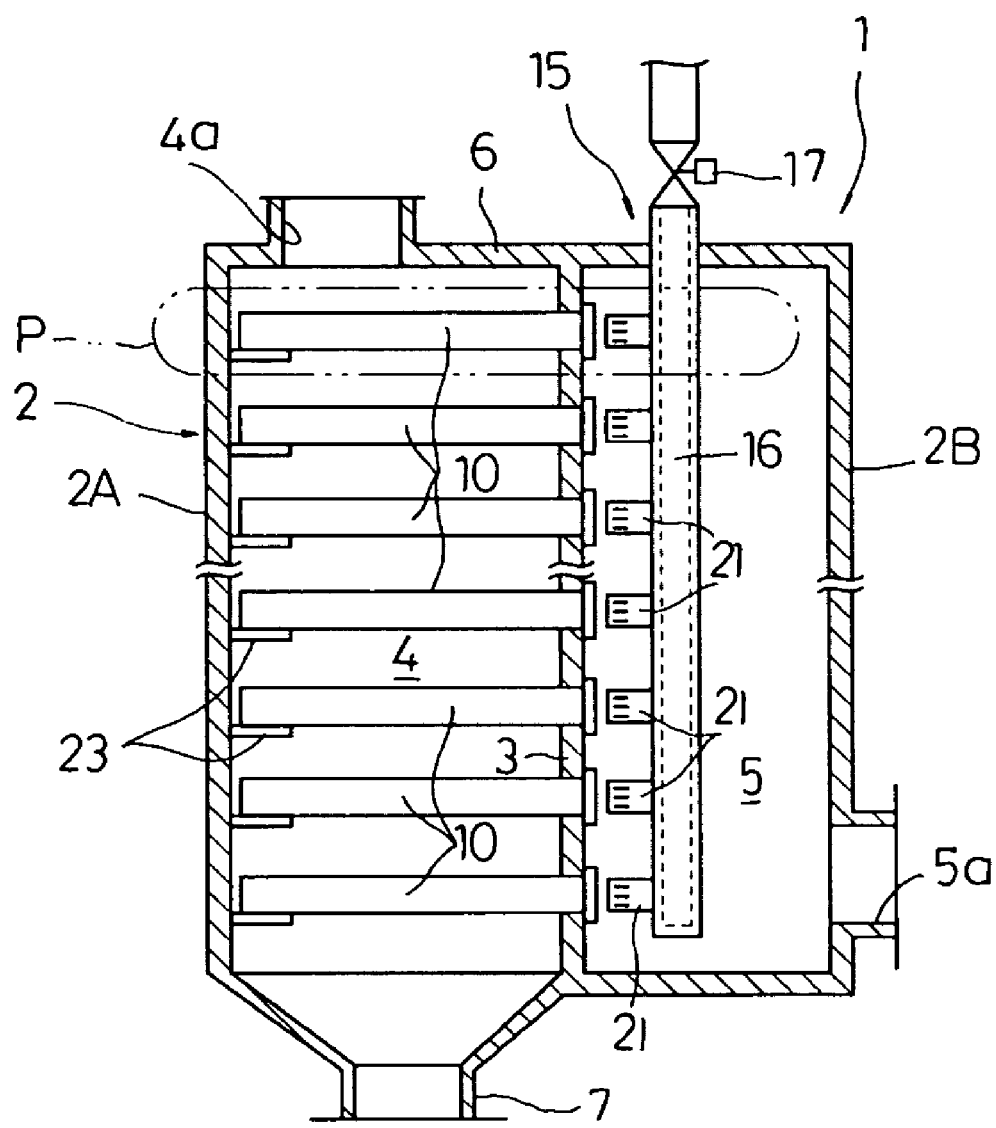
FIG. 1 is a schematic longitudinal sectional view of a gas filter system according to one embodiment of the invention.
Figure 2:
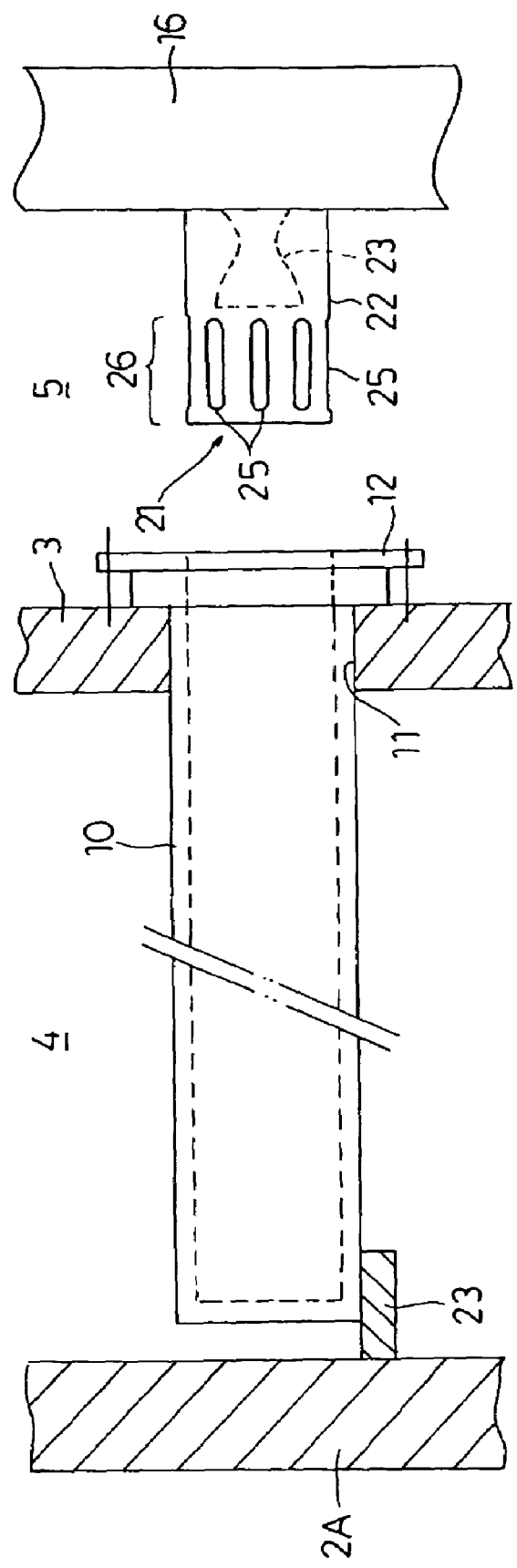
FIG. 2 is an expanded sectional view of a region P shown in FIG. 1.
Figure 3:
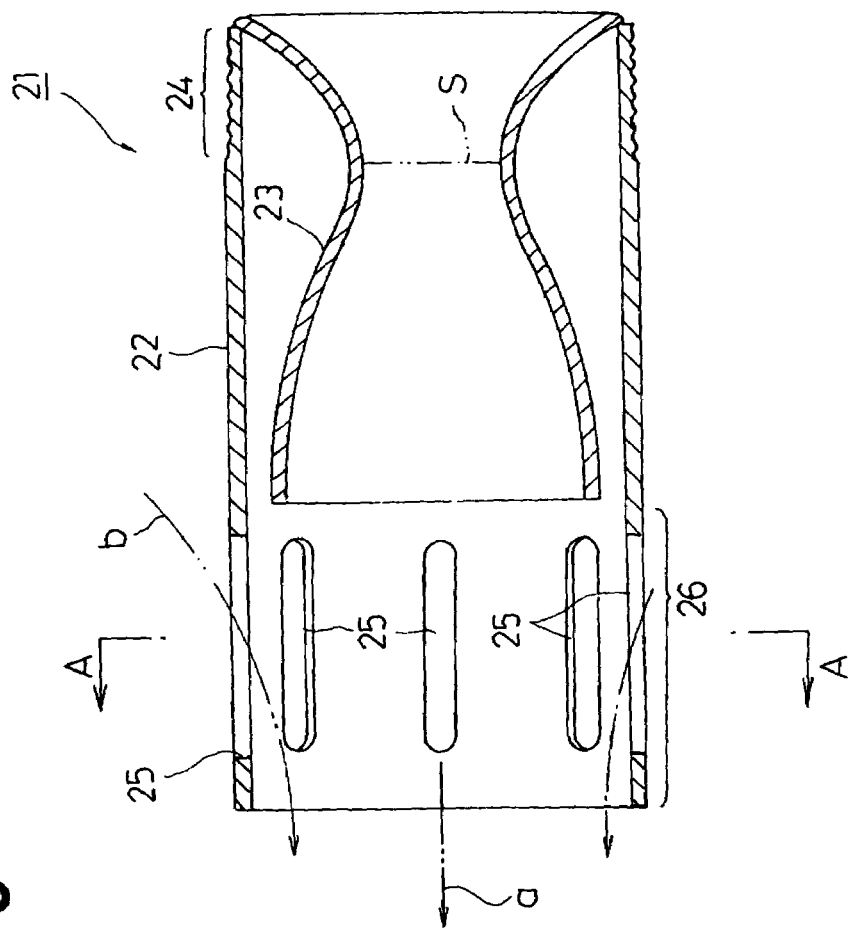
FIG. 3(a) diagrammatically shows a section of a nozzle and FIG. 3(b) is a sectional view taken along line A-A of FIG. 3(a).
Figure 3:
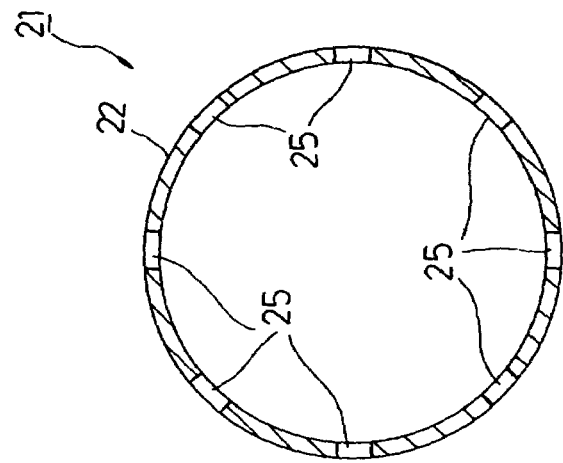

FIG. 1 is a schematic longitudinal sectional view of a gas filter system according to one embodiment of the invention. FIG. 2 is an expanded sectional view of a region P shown in FIG. 1. FIG. 3(a) is a sectional view of a nozzle and FIG. 3(b) is a sectional view taken along line A-A of FIG. 3(a).

As shown in FIG. 1, the gas filter system 1 of this embodiment is equipped with a prismatic casing 2 vertically arranged. This casing 2 includes a partition wall 3 which is vertically arranged so as to divide the inner space of the casing 2. The partition wall 3 is opposed to the opposite outer walls 2A, 2B of the casing 2. A gas introducing chamber 4 is formed between the outer wall 2A and the partition wall 3, whereas a gas exhaust chamber 5 is formed between the other outer wall 2B and the partition wall 3. Formed at the upper end of the casing 2 is a top board 6 including a gas inlet 4a which is located above the gas introducing chamber 4 and through which dust-containing exhaust gas is introduced into the gas introducing chamber 4. Provided in a lower part of the outer wall 2B which defines the gas exhaust chamber 5 is a gas outlet 5a for discharging exhaust gas after dust collection (clean gas) outwardly from the system, which gas has been introduced into the gas exhaust chamber 5. In the lower end of the gas introducing chamber 4, there is provided a vent 7 for discharging dust or the like outwardly from the system which dust has been removed from the outer peripheral surfaces of ceramic filters 10 (described later).

In the gas introducing chamber 4, there are provided a multiplicity of ceramic filters 10 for collecting dust from high-temperature exhaust gas which has been introduced into the gas introducing chamber 4. These ceramic filters 10 lie between the partition wall 3 and the outer wall 2A. Each ceramic filter 10 is formed into a cylindrical shape by porous ceramic having heat resistance such that one end of the ceramic filter 10 close to the partition wall 3 is opened whereas the other end close to the outer wall 2A is closed. In the gas introducing chamber 4, these ceramic filters 10 are aligned in both vertical direction and horizontal direction (i.e., the direction perpendicular to the plane of the sheet of FIG. 1) such that every adjacent ceramic filters 10 are parallel with each other.

As shown in FIG. 2, each ceramic filter 10 has a flange 12 attached to one end thereof. The ceramic filters 10 are each inserted into the gas introducing chamber 4 from the gas exhaust chamber 5 through an opening 11 defined in the partition wall 3, being secured to the partition wall 3 at one end thereof where the flange 12 is positioned. The other end of each ceramic filter 10 is supported on its associated supporting piece 23 attached to the inner wall face of the outer wall 2A.

In the gas exhaust chamber 5, a dust removal device (dust removal means) 15 is provided for removing dust or the like which adhered to the outer surfaces of the ceramic filters 10 at the time of dust collection from the exhaust gas. This dust removal device 15 has a pulse header tube 16 which is vertically arranged within the gas exhaust chamber 5, for feeding pressurized air (fluid) and nozzles 21 for jetting a pressurized fluid. Each nozzle 21 is detachably mounted on a position within the pulse header tube 16 so as to be opposed to the opening of its associated ceramic filter 10. Inserted into the proximal end of the pulse header tube 16 is an electromagnetic valve 17 which is operable so as to be opened and closed thereby controlling feeding/stopping of pressurized air relative to the nozzles 21.

As shown in FIG. 3(a), each nozzle 21 is composed of a cylindrical outer tube 22 and a Laval nozzle section 23 secured to the inside of the proximal end of the outer tube 22. The outside diameter of the proximal end of the Laval nozzle section 23 is substantially equal to the inside diameter of the outer tube 22. The Laval nozzle section 23 is welded to the outer tube 22 at the proximal end thereof, thereby being supported by the outer tube 22. The leading end of the Laval nozzle section 23 has a diameter slightly smaller than the inside diameter of the outer tube 22. Formed in the middle part of the Laval nozzle section 23 is a throat S.

Generally, Laval nozzles are a convergent-divergent nozzle which is narrow in the middle, forming a throat S. Such a Laval nozzle is formed such that air pressure on the side of the proximal end is made higher than air pressure on the side of the leading end and supersonic air accompanied with a shock wave is jetted from the leading end at the time when the speed of the fluid in the throat S becomes sonic speed.

In this embodiment, (1) the diameter of the throat S, (2) the distance from the proximal end of the Laval nozzle section 23 to the throat S, (3) the distance from the throat S to the leading end of the Laval nozzle section 23, (4) the diameter of the opening at the proximal end of the Laval nozzle section 23 and the diameter of the opening at the leading end of the Laval nozzle section 23, (5) the pressure of pressurized air fed to the proximal end of the Laval nozzle section 23, and (6) the internal pressure of the gas exhaust chamber 5 are adjusted such that the speed of pressurized air in the throat S of the Laval nozzle section 23 becomes sonic speed, that is, supersonic pressurized air is jetted from the leading end of the Laval nozzle section 23. The outer peripheral surface of the outer tube 22 at its proximal end is provided with a male screw section 24 for detachably mounting the nozzle 21 on the pulse header tube 16.

In the leading end of the outer tube 22, a fluid guide section 26 is disposed ahead of the Laval nozzle section 23. In the fluid guide section 26, a plurality of suction holes (openings) 25 elongated in the axial direction of the nozzle 21 are aligned at an equal pitch in the peripheral direction of the outer tube 22. These suction holes 25 allow air existing near the nozzle 21 to be suctioned when pressurized air is jetted from the Laval nozzle section 23, so that straightness is imparted to the nozzle-jetted air (i.e., the pressurized air after jetted from the Laval nozzle section 23).

In the gas filter system 1 of the above-described structure, dust-containing exhaust gas, which has been introduced into the gas introducing chamber 4, goes into the inner spaces of the ceramic filters 10 from the gas introducing chamber 4, whereby dust is collected from the exhaust gas to produce clean gas. The exhaust gas which has been thus cleaned (clean gas) is introduced into the gas exhaust chamber 5 by way of the opening defined in one end of each ceramic filter 10 and then discharged outwardly from the system through the gas outlet 5a.

As the dust collection from the exhaust gas by use of the ceramic filters 10 is performed for a specified period of time, dust is adhering to and depositing on the outer peripheral surfaces of the ceramic filters 10 with declining dust collection efficiency. Therefore, dust-off operation needs to be periodically carried out by the dust removal device 15.

To carry out the dust-off operation, an electromagnetic valve 17 is opened thereby feeding pressurized air to the nozzles 21 through the pulse header tube 16. While passing through the throat S of the Laval nozzle section 23, the pressurized air is accelerated until it has sonic speed and further accelerated to be jetted from the leading ends of the nozzles 21 as supersonic nozzle-jetted air accompanied with a shock wave (see arrow a in FIG. 3(a)). Concurrently with the injection of the nozzle-jetted air a, a negative pressure is generated in the front part of the Laval nozzle section 23 so that air near the nozzles 21 is suctioned into the nozzles 21 through the suction holes 25. The air thus suctioned into the nozzles 21 through the suction holes 25 is jetted from the leading ends of the nozzles 21, enclosing and guiding the flow of nozzle-jetted air a (see arrow b in FIG. 3(a)). In this way, dispersion of the nozzle-jetted air a is restricted by the air b flowing from both sides, whereby straightness can be imparted to the nozzle-jetted air a.

As a result, the straight-advancing nozzle-jetted air a accompanied with a shock wave is jetted from the nozzles 21 and effectively directed to the inner spaces of the ceramic filters 10. In this way, masses of compressed air (nozzle-jetted air a) can be intensively shot to the inside of the ceramic filters 10. This enables reliable removal of highly adhesive dust which cannot be removed by back wash using the conventional pulse jet method. The dust removal device 15 of this embodiment is suitably applied to the ceramic filters 10 used at temperatures of 400 to 800° C.

In this embodiment, the excellent back wash effect can be achieved even under the same air pressure as in the conventional cases, so that the inlet pressure of back wash air pressure can be lowered. This leads to a reduction in the amount of air to be used and a reduction in the power of the compressor. In consequence, the running cost for dust removal can be saved. Furthermore, damage to the system resulting from increasing air pressure such as seen in the conventional cases can be avoided.

To check the performance of the dust removal device 15 equipped with the nozzles 21 of this embodiment, a test was conducted in which pressurized air was jetted to the openings of the ceramic filters 10, using the dust removal device 15 and first to third comparative systems (described later) and at the time of jetting pressurized air, the surface pressure (i.e., air pressure to be evacuated to the dust side) of the ceramic filters 10 was measured. As the first comparative system, a prior art dust removal device 110 (see FIG. 5) was employed. The systems shown in FIGS. 4(a) and 4(b) were employed as the second and third comparative systems, respectively.

Figure 4:
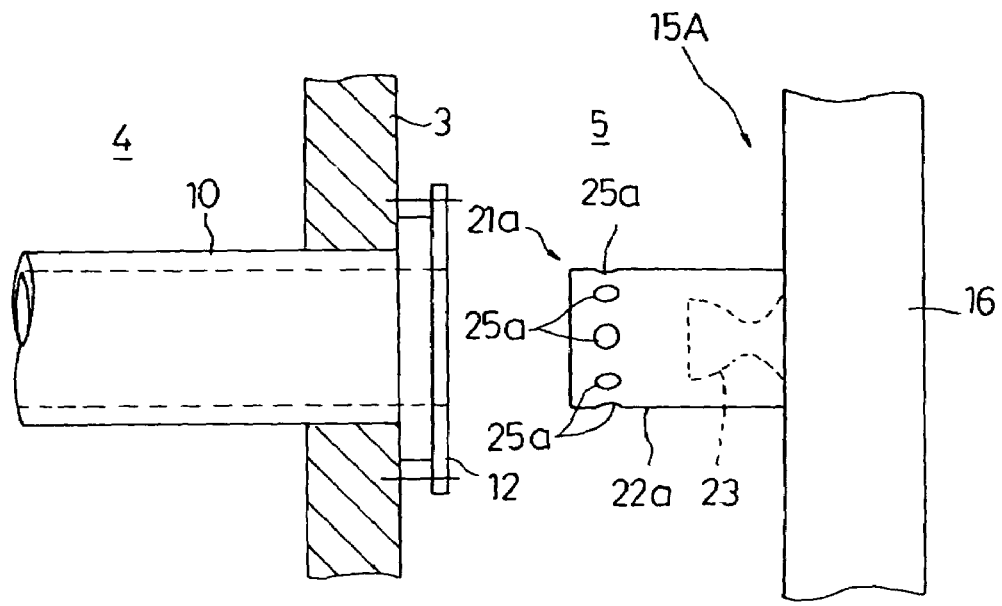
FIGS. 4(a) and 4(b) are explanatory views of a second comparative system and a third comparative system, respectively.
Figure 4:
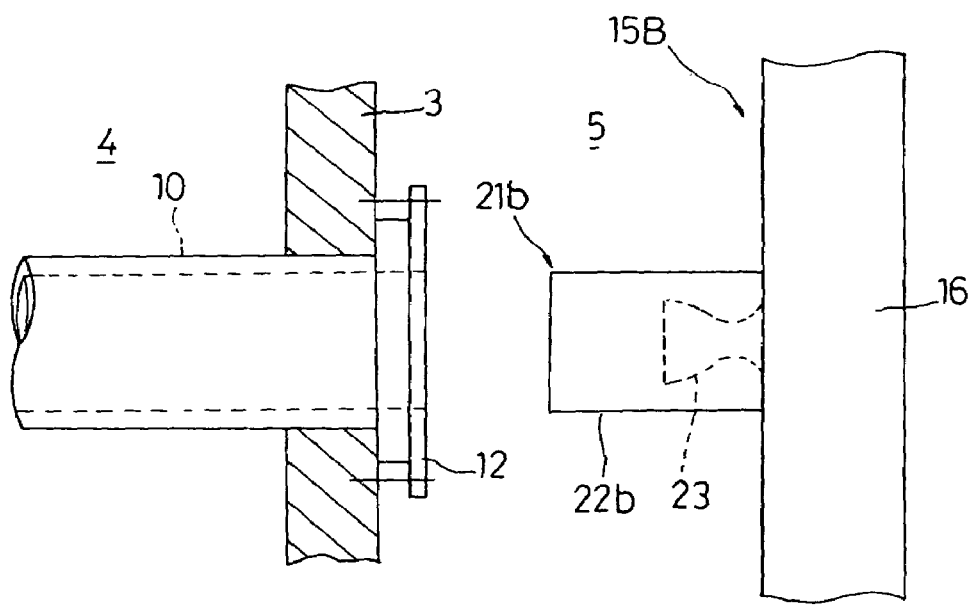
Figure 5:
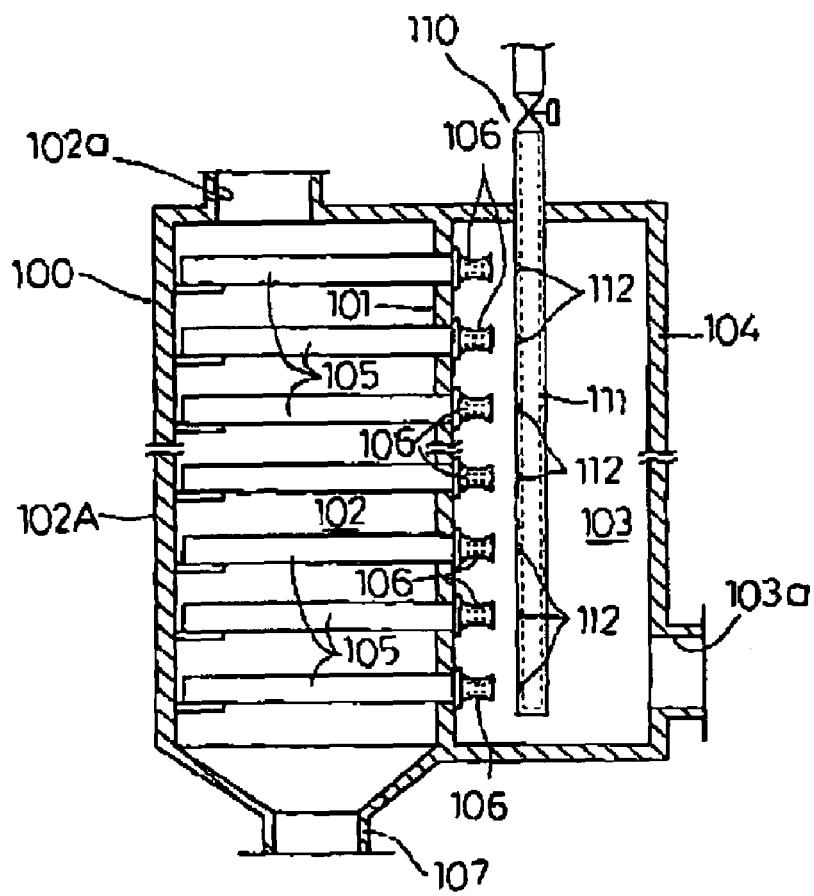
FIG. 5 is a longitudinal sectional view of a prior art gas filter system.

The second comparative system 15A shown in FIG. 4(a) has the same structure as the dust removal device 15 of the present embodiment except that the outer tube 22a is provided, at the leading end thereof, with a plurality of circular suction holes 25a. To achieve an accurate comparison with the nozzles 21 of the present embodiment, the diameter of the suction holes 25a of the second comparative system 15A is made substantially equal to the width of the suction holes 25 of the present embodiment. The third comparative system 15B shown in FIG. 4(b) has the same structure as the dust removal device 15 of the present embodiment except that there are provided no suction holes at the leading end of the outer tube 22b.

Test conditions (the pressure of pressurized air (MPa) and jetting time (s)) set for the air pressure measurement and the result of the measurement (the surface pressure of the ceramic filters 10 (kPa)) are demonstrated in TABLE 1.

TABLE 1

| | Air pressure (MPa) | Jetting time (s) | Surface pressure of the ceramic filters 10 |
|---|---|---|---|
| Dust removal device 15 of the present embodiment | 0.6 | 0.1 | 80–200 |
| First comparative system | 0.6 | 1 | 8–13 |
| Second comparative system 15A | 0.6 | 0.1 | 50–100 |
| Third comparative system 15B | 0.6 | 0.1 | 30–50 |

Let's pay attention to the first comparative system which is the only system having no Laval nozzle section 23. It is understood from TABLE 1 that although the time (1(s)) taken for jetting pressurized air in the first comparative system is ten times those of other systems, the surface pressure of the ceramic filters 10 in the first comparative system is much lower than those of other systems. As obvious from this fact, extraneous matter adhering to the ceramic filters 10 can be effectively removed by jetting supersonic pressurized air accompanied with a shock wave by use of the Laval nozzle section 23.

Next, attention will be paid to the dust removal device 15 of the present embodiment, the second comparative system 15A and the third comparative system 15B. It is understood that the surface pressure of the ceramic filters 10 in the third comparative system 15B is lower than those of the other two systems, i.e., the systems 15 and 15A. The reason for this is thought to be attributable to the fact that, in the dust removal device 15 of the present embodiment and the second comparative system 15A, the flow of air suctioned into the nozzles 21 (21a) through the suction holes 25 (25a) restricts dispersion of the nozzle-jetted air and therefore enhances the straightness (concentration) of the nozzle-jetted air, whereas, in the third comparative system 15B, dispersion of the nozzle-jetted air cannot be restricted so that the amount of air directly shot to the inside of the ceramic filters 10 is small. It is obvious from this that provision of the suction holes 25 in the outer tube 22 enables the nozzles 21 to emit, from their leading ends, a straight stream of nozzle-jetted air which is restrained from dispersing.

As apparent from the comparison between the dust removal device 15 of the present embodiment and the second comparative system 15A, elongation of the suction holes 25 increases the surface pressure of the ceramic filters 10. The reason for this is as follows. That is, in the case of the elongated suction holes 25, air can be efficiently suctioned into each nozzle 21 from a relatively wide region extending from the side of the suction holes 25 to the back of the same so that flows of air along the nozzle-jetted air a (see arrow b of FIG. 3(a)) can be easily formed. In the case of the circular suction holes 25a on the other hand, since the region from which air can be suctioned is limited to a narrow area beside the suction holes 25a, the absolute amount of air to be suctioned into the nozzle 21 becomes small. Therefore, flows of air along the flow of the nozzle-jetted air a cannot be formed successfully with the result that dispersion of the nozzle-jetted air a cannot be satisfactorily restricted. In view of the above fact, mere provision of suction holes is not enough to achieve concentrated distribution of nozzle-jetted air from the nozzles 21, and it is thought to be important to elongate the suction holes 25 in the flowing direction of the pressurized air, that is, the axial direction of the nozzles 21, like the present embodiment.

Although the present embodiment has been particularly described in terms of the nozzles 21 having a double-tube structure composed of the outer tube 22 and the Laval nozzle section 23, the invention is not limited to such a double-tube structure but applicable to nozzles of other types having a Laval nozzle section at the proximal end and elongated suction holes on the side of the leading end. For instance, single-piece nozzles may be used.

Although the present embodiment has been described with a case where pressurized air is supplied to the nozzles 21 through the pulse header tube 16, other pressurized gases such as pressurized nitrogen gas could be supplied. In this case, the same function and effect as in the present embodiment can be achieved.

In addition, although the present embodiment has been described with a case where the nozzles 21 are mounted on the dust removal device 25 of the gas filter system 1, the nozzles 21 having the unique feature of jetting straight-advancing pressurized air can be used in a wide range of applications including various kinds of filter-type dust collectors (e.g., bug filter systems) and removal of extraneous matter in combustion equipment.

The invention claimed is:

1. A nozzle having a tubular fluid guide section disposed at the leading end of a Laval nozzle section having a convergent and then a divergent cross section in a flowing direction of a fluid,
wherein an opening elongated in the flowing direction of the fluid is formed in a wall of the tubular fluid guide section.

2. The nozzle according to claim 1, wherein the Laval nozzle section is secured to the proximal end of a cylindrical outer tube and the fluid guide section is disposed at the leading end of the outer tube.

3. The nozzle according to claim 2, wherein a plurality of said elongated openings are aligned at an equal pitch in a peripheral direction of the outer tube.

4. A dust collector which has a filter member for collecting dust from exhaust gas to clean it and dust removal means for removing extraneous matter adhering to the surface of the filter member with a fluid jetted from a nozzle,
wherein the nozzle has a Laval nozzle section having a convergent and then a divergent cross section in a flowing direction of a fluid and a tubular fluid guide section disposed at the leading end of the Laval nozzle section; and
wherein the fluid guide section has an opening in a wall of the fluid guide section, said opening being elongated in the flowing direction of the fluid.

5. The dust collector according to claim 4, wherein the filter member is a cylindrical ceramic filter opened at one end and closed at the other end.

6. The dust collector according to claim 5, wherein a multiplicity of said ceramic filters are aligned in a parallel fashion in vertical and horizontal directions.

7. The dust collector according to claim 5 or 6,
wherein the dust removal means includes a pulse header tube to which pressurized air is supplied and the nozzle detachably mounted on the pulse header tube; and
wherein the leading end of the nozzle is arranged so as to be opposed to the opening of the ceramic filter.

8. The dust collector according to claim 4,
wherein the nozzle is formed such that the Laval nozzle section is secured to the proximal end of a cylindrical outer tube and the fluid guide section is disposed at the leading end of the outer tube.

9. The dust collector according to claim 8,
wherein a plurality of said elongated openings are aligned at an equal pitch in a peripheral direction of the outer tube.

* * * * *